United States Patent
Tanno

(10) Patent No.: US 11,124,030 B2
(45) Date of Patent: Sep. 21, 2021

(54) PNEUMATIC TIRE

(71) Applicant: The Yokohama Rubber Co., LTD., Tokyo (JP)

(72) Inventor: Atsushi Tanno, Hiratsuka (JP)

(73) Assignee: The Yokohama Rubber Co., LTD.

( * ) Notice: Subject to any disclaimer, the term of this patent is extended or adjusted under 35 U.S.C. 154(b) by 661 days.

(21) Appl. No.: 15/038,020

(22) PCT Filed: Nov. 21, 2014

(86) PCT No.: PCT/JP2014/080949
§ 371 (c)(1),
(2) Date: May 19, 2016

(87) PCT Pub. No.: WO2015/076383
PCT Pub. Date: May 28, 2015

(65) Prior Publication Data
US 2016/0297260 A1      Oct. 13, 2016

(30) Foreign Application Priority Data

Nov. 21, 2013   (JP) .............................. JP2013-241360

(51) Int. Cl.
*B60C 19/00* (2006.01)
*B29D 30/00* (2006.01)

(52) U.S. Cl.
CPC ........ *B60C 19/002* (2013.01); *B29D 30/0061* (2013.01)

(58) Field of Classification Search
CPC ..... B29D 30/0061; B60C 19/002; B60C 5/00; B60C 15/00; B60C 19/00

(Continued)

(56) References Cited

U.S. PATENT DOCUMENTS

2004/0206440 A1* 10/2004 Tsukada ............. B29D 30/0681
                                                                   152/539
2005/0098251 A1   5/2005 Yukawa
(Continued)

FOREIGN PATENT DOCUMENTS

JP      2002-067608        3/2002
JP      2003063208 A  *  3/2003  ........... B60C 19/002
(Continued)

OTHER PUBLICATIONS

JP2003063208A_Machine Translation (Year: 2003).*
(Continued)

*Primary Examiner* — Matthew J Daniels
*Assistant Examiner* — Yunju Kim
(74) *Attorney, Agent, or Firm* — Thorpe North & Western

(57) ABSTRACT

Provided is a pneumatic tire comprising a tread section, a side wall section, and a bead section. A tire constituent member is provided in at least the tread section, extending along the tire circumferential direction and spliced at any positions in the tire circumferential direction. A belt-shaped sound-absorbing member is adhered to a region corresponding to the tread section in the tire inner surface, along the tire circumferential direction and via an adhesive layer. The sound-absorbing member is arranged intermittently along the tire circumferential direction. Sections where the sound-absorbing member is missing are arranged at positions corresponding to the splice portions of the tire constituent member and the sound-absorbing member is arranged so as to not overlap the splice portions.

20 Claims, 6 Drawing Sheets

(58) Field of Classification Search
USPC .................................................. 152/450, 539
See application file for complete search history.

(56) References Cited

U.S. PATENT DOCUMENTS

| | | |
|---|---|---|
| 2005/0155686 A1 | 7/2005 | Yukawa et al. |
| 2006/0185777 A1 | 8/2006 | Tanno |
| 2006/0272759 A1 | 12/2006 | Yukawa |
| 2008/0099116 A1 | 5/2008 | Tanno |
| 2009/0090446 A1 | 4/2009 | Ikeda et al. |
| 2009/0277551 A1* | 11/2009 | Yukawa ................ B60C 19/002 152/450 |
| 2011/0220264 A1 | 9/2011 | Nagai |

FOREIGN PATENT DOCUMENTS

| | | | | |
|---|---|---|---|---|
| JP | 2005-138760 | | 6/2005 | |
| JP | 2006044503 A | * | 2/2006 | ........... B60C 19/002 |
| JP | 2006-335199 | | 12/2006 | |
| JP | 2007-237962 | | 9/2007 | |
| JP | 2013-014141 | | 1/2013 | |
| WO | WO 2003/103989 | | 12/2003 | |
| WO | WO 2005/012008 | | 2/2005 | |
| WO | WO 2006/088195 | | 8/2006 | |
| WO | WO 2007/102279 | | 9/2007 | |

OTHER PUBLICATIONS

JP2006044503A—Machine Translation (Year: 2006).*
International Search Report for International Application No. PCT/JP2014/080949 dated Feb. 17, 2015, 4 pages, Japan.

* cited by examiner

PNEUMATIC TIRE

TECHNICAL FIELD

The present technology relates to a pneumatic tire in which a belt-shaped sound-absorbing member is adhered to a region corresponding to a tread section on a tire inner surface; and particularly relates to a pneumatic tire capable of avoiding reduction in the fixing strength of a sound-absorbing member that is caused by differences in levels at a splice portion of tire constituent members and suppressing peeling of the sound-absorbing member.

BACKGROUND ART

One cause of noise generated in pneumatic tires is cavernous resonance due to vibrations in the air filling the tire interior. This cavity resonance is generated by the tread section vibrating due to unevenness of the road surface and the vibrations of the tread section vibrating the air in the interior of the tire when the tire is rolling.

Disposing a sound-absorbing member inside the cavity formed between the tire and the wheel rim has been proposed as a method for reducing noise caused by this cavity resonance phenomenon. More specifically, a belt-shaped sound-absorbing member is adhered to a region corresponding to the tread section of the tire inner surface (for example, refer to Japanese Unexamined Patent Application Publication Nos. 2002-67608A and 2005-138760A).

However, because differences in level (unevenness) due to a splice portion in the tire constituent members such as an inner liner layer or a carcass layer are formed in the tread section of the pneumatic tire so as to extend in the tire width direction, if the sound-absorbing member is arranged so as to cross the splice portion of the tire constituent members when adhering the belt-shaped sound-absorbing member to a region corresponding to the tread section of the tire inner surface, the deformation of the adhesive layer of the sound-absorbing member is increased and the initial adhesiveness and adhesion durability are deteriorated. Therefore, in a case where the sound-absorbing member is arranged to cross the splice portion of the tire constituent members, there is a problem in that the sound-absorbing member is easily peeled from the tire inner surface.

SUMMARY

The present technology provides a pneumatic tire capable of avoiding reduction in the fixing strength of a sound-absorbing member that is caused by differences in levels at a splice portion of tire constituent members and suppressing peeling of the sound-absorbing member.

A pneumatic tire of the present technology for achieving the object described above includes a tread section forming an annular shape extending in a tire circumferential direction, a pair of side wall sections arranged on both sides of the tread section, and a pair of bead sections arranged inside in a tire radial direction of the side wall sections, in which a tire constituent member is provided in at least the tread section, extending in the tire circumferential direction and spliced at any position in the tire circumferential direction, a belt-shaped sound-absorbing member is adhered to a region corresponding to the tread section in the tire inner surface, along the tire circumferential direction and via an adhesive layer, the sound-absorbing member is arranged intermittently along the tire circumferential direction, sections where the sound-absorbing member is missing are arranged at positions corresponding to the splice portion of the tire constituent members, and the sound-absorbing member is arranged so as to not overlap the splice portion.

In the present technology, in the pneumatic tire, a belt-shaped sound-absorbing member is adhered to a region corresponding to the tread section in the tire inner surface, along the tire circumferential direction and via an adhesive layer, the sound-absorbing member is arranged intermittently along the tire circumferential direction, sections where the sound-absorbing member is missing are arranged at positions corresponding to the splice portion of the tire constituent members, and the sound-absorbing member is arranged so as to not overlap the splice portion, thus it is possible to avoid deterioration in the initial adhesiveness and adhesion durability of the sound-absorbing member caused by differences in level at the splice portion of the tire constituent members. As a result, it is possible to avoid a reduction in the fixing strength of the sound-absorbing member and to suppress peeling of the sound-absorbing member.

In the present technology, it is preferable that the tire constituent member be an inner liner layer and sections where the sound-absorbing member is missing be arranged at positions corresponding to the splice portion of the inner liner layer. In addition, it is preferable that the tire constituent member be a carcass layer and sections where the sound-absorbing member is missing be arranged at positions corresponding to the splice portion of the carcass layer. Furthermore, it is preferable that the tire constituent member be a carcass layer and an inner liner layer and sections where the sound-absorbing member is missing be each arranged at positions corresponding to the splice portion of the carcass layer and the inner liner layer. Since the splice portion of the inner liner layer and the carcass layer forms a difference in the levels in the tire inner surface and have an influence on the initial adhesiveness and adhesion durability of the sound-absorbing member, it is possible to effectively suppress the peeling of the sound-absorbing member by adopting the arrangement as described above.

When a splice-peripheral region is defined to be 20 mm or less from the splice portion in the tire circumferential direction and splice-adjacent regions are defined to be from 20 to 120 mm from the splice portion in the tire circumferential direction, it is preferable that end sections of the sound-absorbing member in the tire circumferential direction be excluded from the splice-peripheral region to be arranged inside the splice-adjacent regions. In a case where the end sections of the sound-absorbing member in the tire circumferential direction are arranged inside the splice-adjacent regions described above, it is possible to sufficiently preserve the arrangement length of the sound-absorbing member and exhibit an excellent noise reduction effect while favorably maintaining the initial adhesiveness and adhesion durability of the sound-absorbing member.

It is preferable that the sound-absorbing member be a single sound-absorbing member extending in the tire circumferential direction and have a uniform thickness in a range corresponding to at least the adhering surface in a cross-section orthogonal to a longitudinal direction of the sound-absorbing member, and that a cross-sectional shape be constant in the longitudinal direction. As a result, it is possible to maximize the content of the sound-absorbing member per adhesive surface area and to obtain an excellent noise reduction effect. In addition, the manufacturing costs are also low because the sound-absorbing member having this shape is easily processed.

It is preferable that the ratio of the volume of the sound-absorbing member with respect to the volume of the cavity formed inside the tire during the rim assembly be greater than 20%. In this manner, an excellent noise reduction effect can be obtained by increasing the volume of the sound-absorbing member and a favorable adhesion state can be preserved for extended periods of time even with a large amount of sound-absorbing member. The volume of the cavity is the volume of the cavity formed between the tire and the rim in a state where the tire is rim-assembled on a regular rim and filled to the regular internal pressure. A "regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, the genuine wheel on which the tire is assembled is used in a case where the tire is a tire mounted on a new car. "Regular inner pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is a tire mounted on a new car.

It is preferable that the hardness of the sound-absorbing member be from 60 to 170 N and the tensile strength of the sound-absorbing member be from 60 to 180 kPa or more. A sound-absorbing member having such physical properties has excellent durability with respect to shear strain caused by expansion due to inflation of the tire or deformation of the tread section due to contact with the ground. The hardness of the sound-absorbing member is measured in accordance with JIS-K6400-2 "Flexible cellular polymeric materials—Physical properties—Part 2: Determination of hardness and stress-strain characteristics in compression" and is measured using the D method therein (a method for determining the force after 20 seconds after applying 25% constant compression). In addition, the tensile strength of the sound-absorbing member is measured in accordance with JIS-K6400-5 "Flexible cellular polymeric materials—Physical properties—Part 5: Determination of tensile strength, elongation at break and tear strength".

It is preferable that the adhesive layer be formed of double-sided adhesive tape and the peeling adhesive strength of the adhesive layer be in a range of 8 to 40 N/20 mm. As a result, it is possible to easily perform a sound-absorbing member attachment operation and a disassembling operation at the time of tire disposal while maintaining excellent fixing strength in the sound-absorbing member. The peeling adhesive strength of the double-sided adhesive tape is measured in accordance with JIS-Z0237. That is, a double-sided pressure-sensitive adhesive sheet is bonded and lined with a PET film with a thickness of 25 μm. The adhesive sheet lining is cut into a rectangular shape of 20 mm×200 mm to prepare a test piece. The peeling liner is peeled from the test piece and the exposed adhesive surface is bonded with a stainless steel (SUS: B304, surface finish BA) plate as an adherend by rolling a 2 kg roller up and down thereon. After holding the result for 30 minutes in an environment of 23° C. and RH50%, the peeling adhesive strength at 180° with respect to the SUS plate is measured using a tensile testing machine under conditions of an environment of 23° C. and RH50%, a peeling angle of 180°, and a tensile speed of 300 mm/min in accordance with JIS Z 0237.

DETAILED DESCRIPTION

Figure 1:
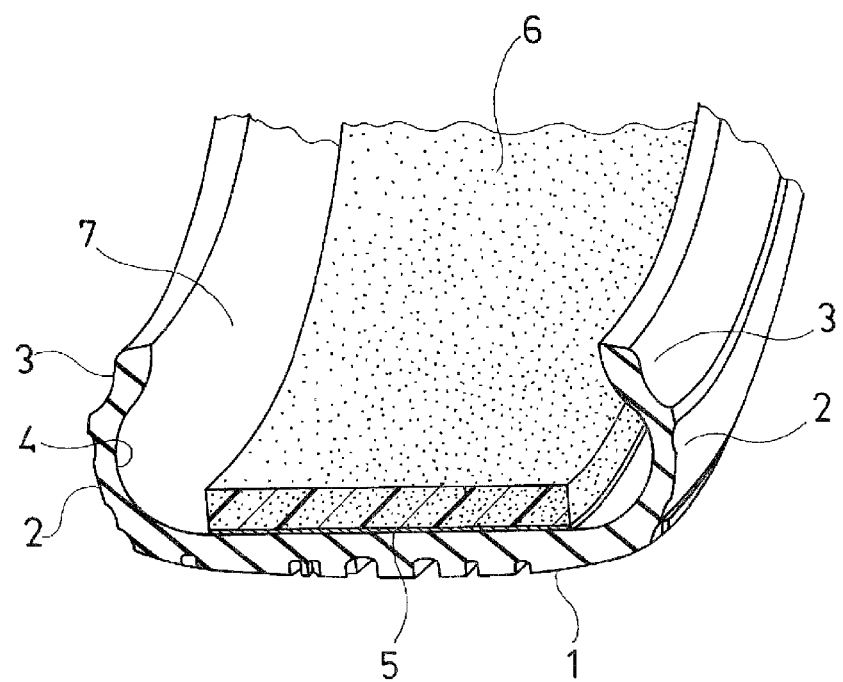
FIG. 1 is a perspective cross-sectional view illustrating a pneumatic tire according to an embodiment of the present technology.
Figure 2:
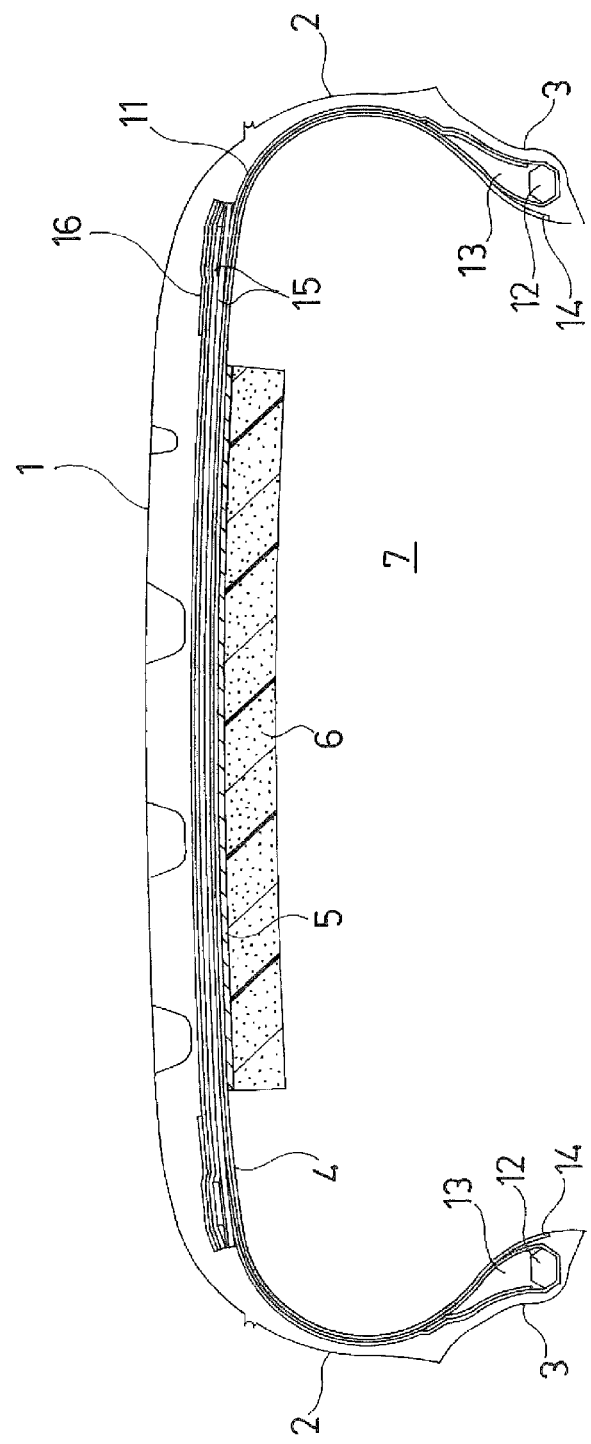
FIG. 2 is a meridian cross-sectional view illustrating the pneumatic tire according to an embodiment of the present technology.

A detailed description of the configuration of the present technology is given below, with reference to the accompanying drawings. FIGS. 1 and 2 illustrate a pneumatic tire according to an embodiment of the present technology. As illustrated in FIG. 1, a pneumatic tire of this embodiment is provided with a tread section 1 extending in the tire circumferential direction to form an annular shape, a pair of side wall sections 2 that is disposed on both sides of the tread section 1, and a pair of bead sections 3 that is disposed on the inner side in the tire radial direction of the side wall sections 2.

As illustrated in FIG. 2, a carcass layer 11 is disposed extending between the pair of bead sections 3, 3. The carcass layer 11 includes a plurality of reinforcing cords extending in the tire radial direction and is folded back around bead cores 12 disposed in each of the bead sections 3 from a tire inner side to a tire outer side. A bead filler 13 having a triangular cross-sectional shape formed from a rubber composition is disposed on a periphery of the bead cores 12. In addition, an inner liner layer 14 is laminated along a tire inner surface 4 on the inside of the carcass layer 11. The carcass layer 11 and the inner liner layer 14 are tire constituent members extending in the tire circumferential direction in at least the tread section 1 and spliced at any position in the tire circumferential direction. The splice portion of the carcass layer 11 and the inner liner layer 14 extends in the tire width direction.

On the other hand, a plurality of belt layers 15 are embedded in the outer peripheral side of the carcass layer 11 in the tread section 1. These belt layers 15 include a plurality of reinforcing cords inclined with respect to the tire circumferential direction and arranged such that the reinforcing cords intersect with each other between the layers. In the belt layers 15, the inclination angle of the reinforcing cords with respect to the tire circumferential direction is set to, for example, a range of 10 to 40°. Steel cords are preferably used as the reinforcing cords of the belt layers 15. For the purpose of improving the high-speed durability, at least one belt cover layer 16 in which the reinforcing cords line up at an angle of, for example, 5° or less with respect to the tire circumferential direction is arranged on the outer peripheral side of the belt layers 15. Organic fiber cords of nylon, aramid, or the like are preferably used as the reinforcing cords of the belt cover layer 16.

In a region in the pneumatic tire described above corresponding to the tread section 1 of the tire inner surface 4, a belt-shaped sound-absorbing member 6 is adhered along the tire circumferential direction via an adhesive layer 5. The sound-absorbing member 6 is formed of a porous material having open cells and has predetermined acoustic absorption characteristics based on the porous structure thereof. A foamed polyurethane may be used as the porous material of the sound-absorbing member 6. On the other hand, a paste-like adhesive or double-sided adhesive tape can be used as the adhesive layer 5.

Figure 3:
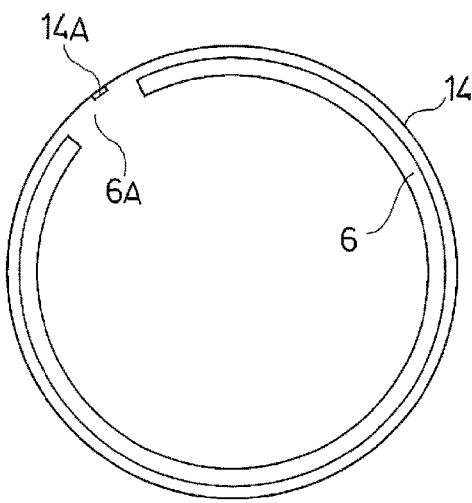
FIG. 3 is an equatorial cross-sectional view illustrating a positional relationship between sections where a sound-absorbing member is missing and a splice portion of an inner liner layer in the pneumatic tire of the present technology.

FIG. 3 is a tire equatorial cross-sectional view illustrating a positional relationship between sections where the sound-absorbing member is missing and a splice portion of an inner liner layer in the pneumatic tire of the present technology. As illustrated in FIG. 3, the sound-absorbing member 6 is arranged intermittently along the tire circumferential direction and a missing section 6A of the sound-absorbing member 6 is arranged at a position corresponding to a splice portion 14A of the inner liner layer 14 (the tire constituent member). In other words, the sound-absorbing member 6 is arranged so as to not overlap the splice portion 14A.

Figure 4A:
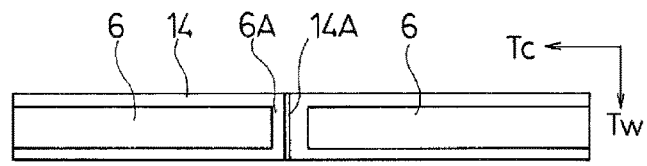
FIGS. 4A to 4E are developed views illustrating a positional relationship between sections where the sound-absorbing member is missing and a splice portion of an inner liner layer in the pneumatic tire of the present technology, and are views illustrating various modifications.
Figure 4B:
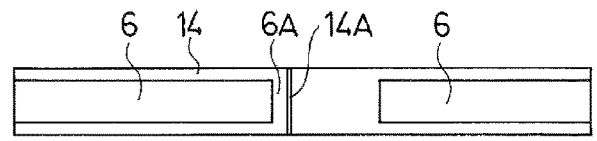
Figure 4C:
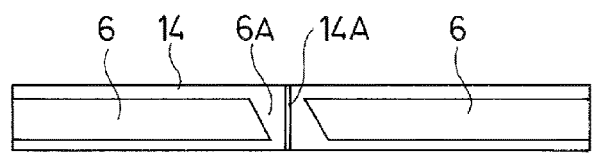
Figure 4D:
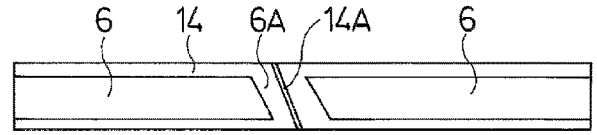
Figure 4E:
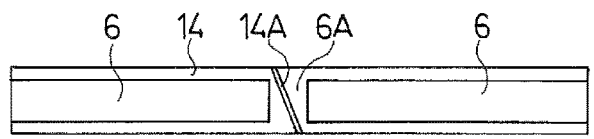

FIG. 4A to FIG. 4E are tire inner surface views which illustrate a positional relationship between sections where the sound-absorbing member is missing and a splice portion of an inner liner layer in the pneumatic tire of the present technology. In FIG. 4A to FIG. 4E, Tc is the tire circumferential direction and Tw is the tire width direction. In FIG. 4A, the splice portion 14A of the inner liner layer 14 and the missing section 6A of the sound-absorbing member 6 both extend in parallel with the tire width direction Tw and the splice portion 14A is arranged at the central position of the missing section 6A. In FIG. 4B, the splice portion 14A of the inner liner layer 14 and the missing section 6A of the sound-absorbing member 6 both extend in parallel with the tire width direction Tw and the splice portion 14A is arranged at a position shifted from the central position of the missing section 6A. In FIG. 4C, the splice portion 14A of the inner liner layer 14 extends in parallel with the tire width direction Tw, the missing section 6A of the sound-absorbing member 6 extends inclined with respect to the tire width direction Tw, and the splice portion 14A is arranged at the central position in the missing section 6A. In FIG. 4D, the splice portion 14A of the inner liner layer 14 and the missing section 6A of the sound-absorbing member 6 both extend inclined with respect to the tire width direction Tw and the splice portion 14A is arranged at the central position in the missing section 6A. In FIG. 4E, the splice portion 14A of the inner liner layer 14 extends inclined with respect to the tire width direction Tw, the missing section 6A of the sound-absorbing member 6 extends in parallel with the tire width direction Tw, and the splice portion 14A is arranged at the central position in the missing section 6A.

Figure 5:
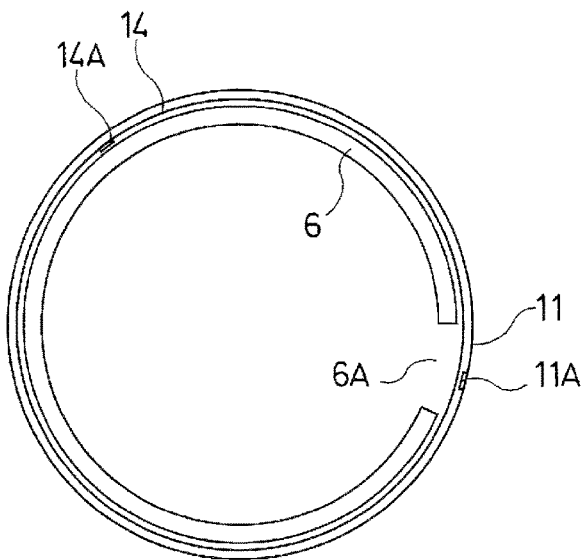
FIG. 5 is an equatorial cross-sectional view illustrating a positional relationship between sections where the sound-absorbing member is missing and a splice portion of a carcass layer in the pneumatic tire of the present technology.

FIG. 5 is a tire equatorial cross-sectional view illustrating a positional relationship between sections where the sound-absorbing member is missing and a splice portion of a carcass layer in the pneumatic tire of the present technology. As illustrated in FIG. 5, the sound-absorbing member 6 is arranged intermittently along the tire circumferential direction and the missing section 6A of the sound-absorbing member 6 is arranged at a position corresponding to a splice portion 11A of the carcass layer 11 (tire constituent member). That is, the sound-absorbing member 6 is arranged so as to not overlap the splice portion 11A. In FIG. 5, the splice portion 14A of the inner liner layer 14 is arranged so as to overlap the sound-absorbing member 6; however, it is possible to define only the positional relationship between the missing section 6A of the sound-absorbing member 6 and the splice portion 11A of the carcass layer 11 in this manner.

Figure 6A:
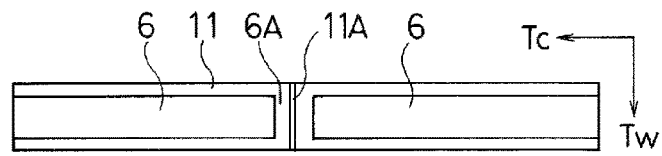
FIGS. 6A to 6E are developed views illustrating a positional relationship between sections where the sound-absorbing member is missing and a splice portion of a carcass layer in the pneumatic tire of the present technology, and are views illustrating various modifications.
Figure 6B:
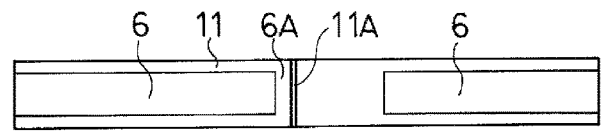
Figure 6C:
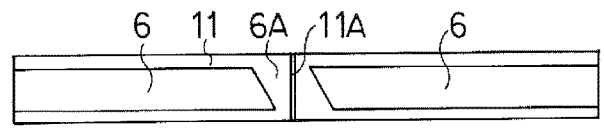
Figure 6D:
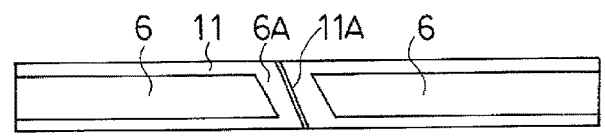
Figure 6E:
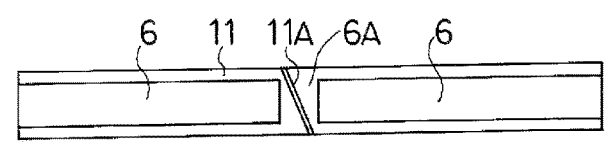

FIG. 6A to FIG. 6E are tire inner surface views which illustrate a positional relationship between sections where the sound-absorbing member is missing and a splice portion of a carcass layer in the pneumatic tire of the present technology. In FIG. 6A to FIG. 6E, Tc is the tire circumferential direction and Tw is the tire width direction. In FIG. 6A, the splice portion 11S of the carcass layer 11 and the missing section 6A of sound-absorbing member 6 both extend in parallel with the tire width direction Tw and the splice portion 11A is arranged at the central position of the missing section 6A. In FIG. 6B, the splice portion 11A of the carcass layer 11 and the missing section 6A of the sound-absorbing member 6 both extend in parallel with the tire width direction Tw and the splice portion 11A is arranged at a position shifted from the center of the missing section 6A. In FIG. 6C, the splice portion 11A of the carcass layer 11 extends in parallel with the tire width direction Tw, the missing section 6A of the sound-absorbing member 6 extends inclined with respect to the tire width direction Tw, and the splice portion 11A is arranged at the central position of the missing section 6A. In FIG. 6D, the splice portion 11A of the carcass layer 11 and the missing section 6A of the sound-absorbing member 6 both extend inclined with respect to the tire width direction Tw and the splice portion 11A is arranged at the central position of the missing section 6A. In FIG. 6E, the splice portion 11A of the carcass layer 11 extends inclined with respect to the tire width direction Tw, the missing section 6A of the sound-absorbing member 6 extends in parallel with the tire width direction Tw, and the splice portion 11A is arranged at the central position of the missing section 6A.

In the pneumatic tire described above, when the belt-shaped sound-absorbing member 6 is adhered to a region corresponding to the tread section 1 of the tire inner surface 4 in the tire circumferential direction via the adhesive layer 5, the sound-absorbing member 6 is arranged intermittently along the tire circumferential direction, the missing section 6A of the sound-absorbing member 6 is arranged at a position corresponding to the splice portions 11A and 14A of the tire constituent members such as the carcass layer 11 and the inner liner layer 14, the sound-absorbing member 6 is arranged so as to not overlap the splice portions 11A and 14A, thus it is possible to avoid deterioration of the initial adhesion and the adhesion durability of the sound-absorbing member 6 caused by differences in level (unevenness) in the splice portions 11A and 14A. As a result, it is possible to avoid a reduction in the fixing strength of the sound-absorbing member 6 and to suppress peeling of the sound-absorbing member 6.

Figure 7:
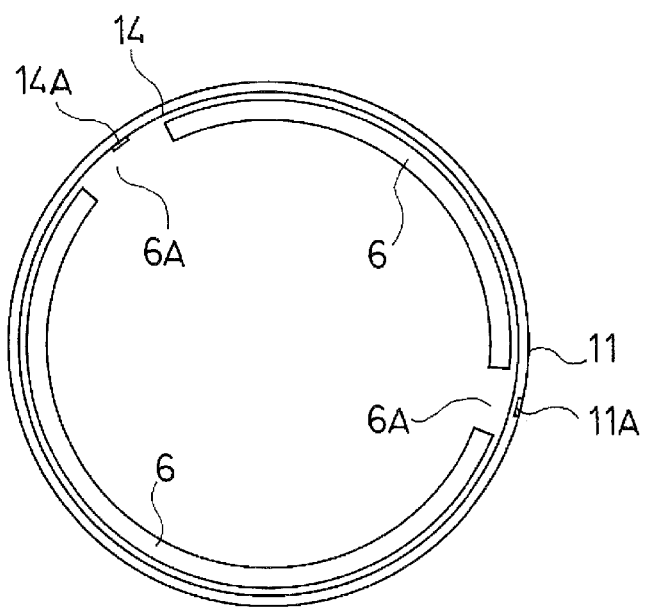
FIG. 7 is an equatorial cross-sectional view illustrating a positional relationship between sections where the sound-absorbing member is missing and a splice portion of a carcass layer and an inner liner layer in the pneumatic tire of the present technology.
Figure 8:
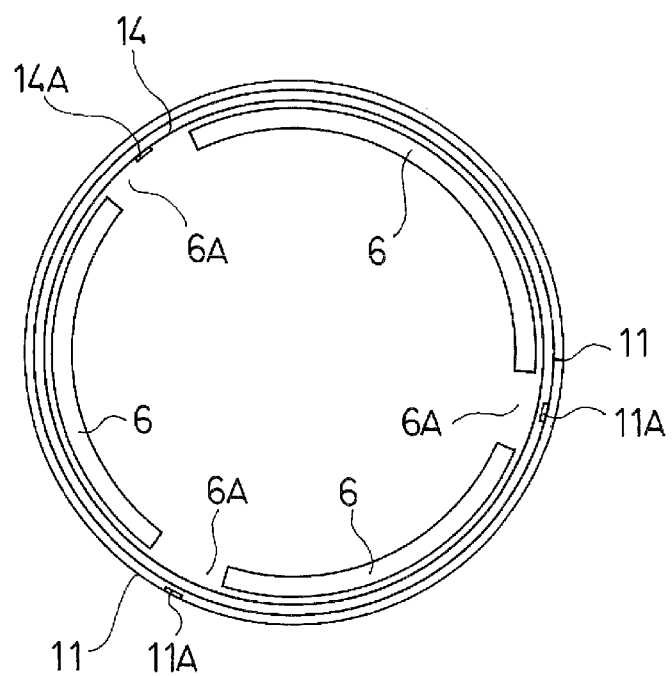
FIG. 8 is an equatorial cross-sectional view illustrating a positional relationship between sections where the sound-absorbing member is missing and a splice portion of a carcass layer and an inner liner layer in the pneumatic tire of the present technology.

FIG. 7 and FIG. 8 are tire equatorial cross-sectional views illustrating a positional relationship between sections where the sound-absorbing member is missing and the splice portion of a carcass layer and an inner liner layer in the pneumatic tire of the present technology. As illustrated in FIG. 7, the sound-absorbing member 6 is arranged intermittently along the tire circumferential direction and the missing sections 6A of the sound-absorbing member 6 are each arranged at positions corresponding to the splice portions 11A and 14A of the carcass layer 11 and the inner liner layer 14. In other words, the sound-absorbing member 6 is arranged so as to not overlap the splice portions 11A and 14A. In addition, as illustrated in FIG. 8, in the pneumatic tire having two of the carcass layers 11, the missing sections 6A of the sound-absorbing member 6 may be arranged at positions corresponding to the splice portions 11A of each of the carcass layers 11.

Figure 9:
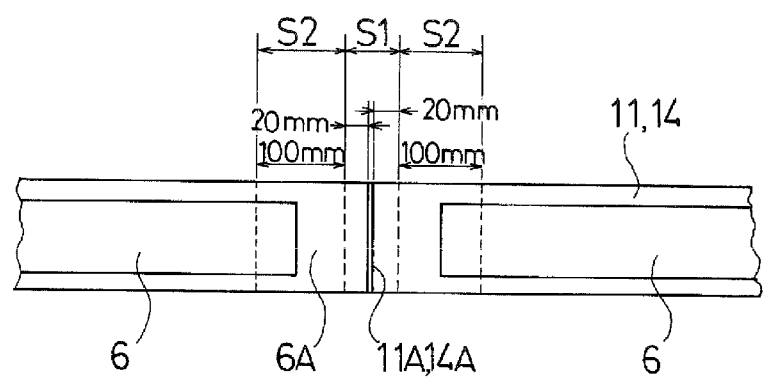
FIG. 9 is a developed view illustrating a preferable arrangement position of end sections of the sound-absorbing member in a circumferential direction in the pneumatic tire of the present technology.

FIG. 9 illustrates a preferable arrangement position of end sections of the sound-absorbing member in the tire circumferential direction in the pneumatic tire of the present technology. As illustrated in FIG. 9, when a splice-peripheral region S1 is defined to be 20 mm or less from the splice portions 11A and 14A in the tire circumferential direction and splice-adjacent regions S2 are defined to be from 20 to 120 mm from the splice portions 11A and 14A in the tire circumferential direction, it is preferable that end sections of the sound-absorbing member 6 in the tire circumferential direction not be inside the splice-peripheral region S1. The difference in levels in the splice portions 11A and 14A is easily influenced in the splice-peripheral region S1. In particular, the end sections of the sound-absorbing member 6 in the tire circumferential direction may be excluded from the splice-peripheral region S1 to be arranged inside the splice-adjacent regions S2. In a case where the end sections of the sound-absorbing member 6 in the tire circumferential direction are arranged inside the splice-adjacent regions S2, it is possible to sufficiently preserve the arrangement length of the sound-absorbing member 6 and exhibit an excellent noise reduction effect based on the sound-absorbing member 6 while favorably maintaining the initial adhesion and the adhesion durability of the sound-absorbing member 6.

In the pneumatic tire described above, a single sound-absorbing member 6 extends in the tire circumferential direction and it is preferable that the sound-absorbing member 6 have a uniform thickness at least in a range corresponding to the adhering surface in a cross-section orthogonal to a longitudinal direction, and a cross-sectional shape is constant in the longitudinal direction. In particular, it is preferable that the cross-sectional shape of the cross-section orthogonal to the longitudinal direction of the sound-absorbing member 6 be a rectangular shape (including a square shape); however, in some cases, it is also possible for the cross-sectional shape to be a reverse trapezoid in which the adhering surface sides are narrowed. As a result, it is possible to maximize the content of the sound-absorbing member 6 per adhesive surface area and obtain an excellent noise reduction effect. In addition, the manufacturing costs are also low because the sound-absorbing member 6 having this shape is easily processed.

A cavity 7 is formed between the tire inner surface 4 and the rim when rim-assembling the pneumatic tire described above and the ratio of the volume of the sound-absorbing member 6 with respect to the volume of the cavity 7 is preferably greater than 20%. An excellent noise reduction effect can be obtained by increasing the volume of the sound-absorbing member 6 in this manner and a favorable adhesion state can be preserved for extended periods of time even with a large amount of sound-absorbing member 6. Here, the width of the sound-absorbing member 6 is preferably in a range of 30 to 90% of the tire ground contact width. In addition, the sound-absorbing member 6 is preferably a non-annular shape.

The hardness (JIS-K6400-2) of the sound-absorbing member 6 is preferably from 60 to 170 N and the tensile strength (JIS-K6400-5) of the sound-absorbing member 6 is preferably from 60 to 180 kPa. The sound-absorbing member 6 having these properties is excellent in durability against shear strain. When the hardness or tensile strength of the sound-absorbing member 6 is excessively small, the durability of the sound-absorbing member 6 is reduced. In particular, the hardness of the sound-absorbing member 6 is preferably from 70 to 160 N and more preferably from 80 to 140 N. In addition, the tensile strength of the sound-absorbing member 6 is preferably set to from 75 to 165 kPa and more preferably from 90 to 150 kPa.

The peeling adhesive strength (Japanese Industrial Standard JIS-Z0237: 2009) of the adhesive layer 5 is preferably in a range of 8 to 40 N/20 mm. As a result, it is possible to easily perform the sound-absorbing member 6 attachment operation and a disassembling operation at the time of tire disposal while maintaining excellent fixing strength in the sound-absorbing member 6. That is, when the peeling strength of the adhesive layer 5 is excessively weak, the fixed state of the sound-absorbing member 6 is unstable, in contrast, the peeling strength of the adhesive layer 5 is excessively strong, it is difficult to change the attachment position in the attachment operation of the sound-absorbing member 6, and it is difficult to peel the sound-absorbing member 6 at the time of tire disposal. In particular, the peeling adhesive strength of the adhesive layer 5 is preferably from 9 to 30 N/20 mm and more preferably from 10 to 25 N/20 mm.

EXAMPLES

Based on pneumatic tires with a tire size of 195/65R15 including a tread section forming an annular shape extending in a tire circumferential direction, a pair of side wall sections arranged on both sides of the tread section, and a pair of bead sections arranged inside in a tire radial direction of the side wall sections, in which a belt-shaped sound-absorbing member is adhered to a region corresponding to the tread section in the tire inner surface, along the tire circumferential direction and via an adhesive layer, tires of Comparative Example 1 and Working Examples 1 to 3 were manufactured in which the arrangement state of the sound-absorbing member was different.

In Comparative Example 1, the belt-shaped sound-absorbing member was arranged over the entire region on the tire circumference without providing a missing section.

In Working Example 1, the sound-absorbing member was arranged intermittently in the tire circumferential direction as in FIG. 3, the sections where the sound-absorbing member is missing were arranged at positions corresponding to the splice portion in the inner liner layer, the sound-absorbing member was arranged so as to not overlap with the splice portion of the inner liner layer.

In Working Example 2, the sound-absorbing member was arranged intermittently in the tire circumferential direction as in FIG. 5, the sections where the sound-absorbing member is missing were arranged at positions corresponding to the splice portion in the carcass layer, and the sound-absorbing member was arranged so as to not overlap the splice portion of the carcass layer.

In Working Example 3, the sound-absorbing member was arranged intermittently in the tire circumferential direction as in FIG. 7, the sections where the sound-absorbing member is missing were each arranged at positions corresponding to the splice portion in the carcass layer and the inner liner layer, and the sound-absorbing member was arranged so as to not overlap the splice portion of the carcass layer and the inner liner layer.

Comparative Example 1 and Working Examples 1 to 3 had the following in common. The cross-sectional shape in the cross-section orthogonal to the longitudinal direction of the sound-absorbing member was set as a rectangle and the cross-sectional shape thereof was constant along the tire circumferential direction. The ratio of the volume of the sound-absorbing member with respect to the volume of the cavity formed inside the tire during rim assembly was set to 25%. The hardness of the sound-absorbing member was set to 91 N and the tensile strength of the sound-absorbing member was set to 132 kPa. The peeling adhesive strength of the adhesive layer was set to 16 N/20 mm. In addition, in Working Examples 1 to 3, the end sections of the sound-absorbing member in the tire circumferential direction were arranged at positions separated by 50 mm from the splice portion in the tire circumferential direction.

After assembling each of the pneumatic tires of Comparative Example 1 and Working Examples 1 to 3 on wheels with a rim size 15×6JJ and carrying out running tests 100 times in a drum testing machine under conditions of an air pressure of 150 kPa, a load of 5 kN, and a speed of 100 km/h, the presence or absence of adhesion peeling in the sound-absorbing member was visually confirmed. In addition, as the index of the adhesion peeling resistance, running tests were carried out in a drum testing machine under the same running conditions as described above, the presence or absence of adhesion peeling of the sound-absorbing member every ten hours was confirmed, and the running distance until the adhesion peeling is generated was determined. Evaluation results were expressed as index values, Comparative Example 1 being assigned an index value of 100. Larger index values indicate superior adhesion peeling resistance. The results are shown in Table 1.

TABLE 1

|  | Comparative Example 1 | Working Example 1 | Working Example 2 | Working Example 3 |
|---|---|---|---|---|
| Presence or absence of missing section | Absent | Present | Present | Present |
| Arrangement of the missing section in the circumferential direction | — | FIG. 3 | FIG. 5 | FIG. 7 |
| Presence or absence of adhesion peeling of sound-absorbing member | Present | Absent | Absent | Absent |
| Adhesion peeling resistance | 100 | 110 | 110 | 115 |

As shown in Table 1, in the tire of Comparative Example 1, adhesion peeling of the sound-absorbing member was remarkably generated after carrying out the running tests for 100 hours; however, in the tires of Working Examples 1 to 3, adhesion peeling of the sound-absorbing member after the running tests for 100 hours was not seen at all.

Next, tires of Working Examples 4 to 10 were prepared having the same structure as Example 1 except that the hardness of the sound-absorbing member, the tensile strength of the sound-absorbing member, the peeling adhesive strength of the adhesive layer, and the distance in the tire circumferential direction between the end sections of the sound-absorbing member in the tire circumferential direction and the splice portion were differentiated.

For the tires of Working Examples 4 to 10, using the same methods as described above, the presence or absence of the adhesion peeling of the sound-absorbing member and the adhesion peeling resistance were evaluated after carrying out the running tests for 100 hours. The results are shown in Table 2.

TABLE 2

|  | Working Example 4 | Working Example 5 | Working Example 6 | Working Example 7 | Working Example 8 | Working Example 9 | Working Example 10 |
|---|---|---|---|---|---|---|---|
| Presence or absence of missing section | Present | Present | Present | Present | Present | Present | Present |
| Arrangement of the missing section in the circumferential direction | FIG 3 | FIG. 3 | FIG 3 | FIG 3 | FIG 3 | FIG. 3 | FIG. 3 |
| Hardness of the sound-absorbing member (N) | 60 | 170 | 91 | 91 | 91 | 91 | 91 |
| Tensile strength (kPa) of the sound-absorbing member | 60 | 180 | 132 | 132 | 132 | 132 | 132 |
| Peel adhesion strength of the adhesive layer (N/20 mm) | 16 | 16 | 8 | 40 | 16 | 16 | 16 |

TABLE 2-continued

|  | Working Example 4 | Working Example 5 | Working Example 6 | Working Example 7 | Working Example 8 | Working Example 9 | Working Example 10 |
|---|---|---|---|---|---|---|---|
| Distance (mm) between end sections and splice portion of the sound-absorbing member | 50 | 50 | 50 | 50 | 10 | 20 | 120 |
| Presence or absence of adhesion peeling of sound-absorbing member | Absent | Absent | Absent | Absent | Absent | Absent | Absent |
| Adhesion peeling resistance | 110 | 110 | 105 | 120 | 105 | 110 | 110 |

As shown in Table 2, in the tires of Working Examples 4 to 7 in which the hardness of the sound-absorbing member, the tensile strength of the sound-absorbing member, the peeling adhesive strength of the adhesive layer were changed, in the same manner as Example 1, adhesion peeling of the sound-absorbing member was not seen at all after carrying out the running tests for 100 hours. In addition, as is clear from a comparison of Example 1 and Working Examples 8 to 10, it is determined that it is possible to obtain a favorable adhesion peeling resistance by appropriately adjusting the distance in the tire circumferential direction between the end sections of the sound-absorbing member in the tire circumferential direction and the splice portion. However, when the distance between the end sections of the sound-absorbing member and the splice portion is excessively increased, the noise reduction effect is reduced in accordance with a reduction in the sound-absorbing member.

The invention claimed is:

1. A pneumatic tire comprising:
a tread section forming an annular shape extending in a tire circumferential direction;
a pair of side wall sections arranged on both sides of the tread section; and
a pair of bead sections arranged inside in a tire radial direction of the side wall sections, wherein
a tire constituent member is provided in at least the tread section, extending in the tire circumferential direction and spliced at any position in the tire circumferential direction, a belt-shaped sound-absorbing member is adhered to a region corresponding to the tread section in a tire inner surface, along the tire circumferential direction and via an adhesive layer, the sound-absorbing member is formed of a porous material having open cells, the sound-absorbing member is arranged intermittently along the tire circumferential direction so as to be exposed to the tire inner surface, sections where the sound-absorbing member is missing are arranged at positions corresponding to a splice portion of the tire constituent member, and the sound-absorbing member is arranged so as to not overlap the splice portion.

2. The pneumatic tire according to claim 1, wherein the tire constituent member is an inner liner layer and the sections where the sound-absorbing member is missing are arranged at the positions corresponding to the splice portion of the inner liner layer.

3. The pneumatic tire according to claim 1, wherein the tire constituent member is a carcass layer and the sections where the sound-absorbing member is missing are arranged at the positions corresponding to the splice portion of the carcass layer.

4. The pneumatic tire according to claim 1, wherein the tire constituent member is a carcass layer and an inner liner layer, and the sections where the sound-absorbing member is missing are each arranged at the positions corresponding to the splice portion of the carcass layer and the inner liner layer.

5. The pneumatic tire according to claim 4, wherein, when a splice-peripheral region is defined to be 20 mm or less from the splice portion in the tire circumferential direction and splice-adjacent regions are defined to be from 20 to 120 mm from the splice portion in the tire circumferential direction, end sections of the sound-absorbing member in the tire circumferential direction are excluded from the splice-peripheral region to be arranged inside the splice-adjacent regions.

6. The pneumatic tire according to claim 5, wherein the sound-absorbing member is a single sound-absorbing member extending in the tire circumferential direction and has a uniform thickness in at least a range corresponding to the surface to which belt-shaped sound-absorbing member is adhered in a cross-section orthogonal to a longitudinal direction of the sound-absorbing member, and a cross-sectional shape is constant in the longitudinal direction.

7. The pneumatic tire according to claim 6, wherein a ratio of a volume of the sound-absorbing member with respect to a volume of a cavity formed inside the tire during rim assembly is greater than 20%.

8. The pneumatic tire according to claim 7, wherein a hardness of the sound-absorbing member is from 60 to 170 N and a tensile strength of the sound-absorbing member is from 60 to 180 kPa.

9. The pneumatic tire according to claim 8, wherein the adhesive layer is formed of double-sided adhesive tape and a peeling adhesive strength of the adhesive layer is in a range of 8 to 40 N/20 mm.

10. The pneumatic tire according to claim 9, wherein the porous material is a foamed polyurethane.

11. The pneumatic tire according to claim 1, wherein, when a splice-peripheral region is defined to be 20 mm or less from the splice portion in the tire circumferential direction and splice-adjacent regions are defined to be from 20 to 120 mm from the splice portion in the tire circumferential direction, end sections of the sound-absorbing member in the tire circumferential direction are excluded from the splice-peripheral region to be arranged inside the splice-adjacent regions.

12. The pneumatic tire according to claim 1, wherein the sound-absorbing member is a single sound-absorbing member extending in the tire circumferential direction and has a uniform thickness in at least a range corresponding to the surface to which belt-shaped sound-absorbing member is adhered in a cross-section orthogonal to a longitudinal direction of the sound-absorbing member, and a cross-sectional shape is constant in the longitudinal direction.

13. The pneumatic tire according to claim 1, wherein a hardness of the sound-absorbing member is from 60 to 170 N and a tensile strength of the sound-absorbing member is from 60 to 180 kPa.

14. The pneumatic tire according to claim 1, wherein the adhesive layer is formed of double-sided adhesive tape and a peeling adhesive strength of the adhesive layer is in a range of 8 to 40 N/20 mm.

15. The pneumatic tire according to claim 1, wherein the porous material is a foamed polyurethane.

16. The pneumatic tire according to claim 1, wherein: the sound absorbing member extends across a majority of the tread section and extends beneath all of circumferential main grooves in the tread section.

17. The pneumatic tire according to claim 1, wherein: the tire constituent member includes a carcass layer and an inner liner layer; and
the splice portions of the inner liner layer and the carcass layer are offset from one another.

18. The pneumatic tire according to claim 1, wherein: the tire constituent member includes a carcass layer and an inner liner layer; and
ends of the sound-absorbing member on either side of the splice portion of the inner liner layer and the carcass layer are spaced differently from one another.

19. The pneumatic tire according to claim 1, wherein a ratio of a volume of the sound-absorbing member with respect to a volume of a cavity formed inside the tire during rim assembly is greater than 20%.

20. The pneumatic tire according to claim 1, wherein a ratio of a volume of the sound-absorbing member with respect to a volume of a cavity formed inside the tire during rim assembly is greater than 22%.

* * * * *